April 13, 1954 — L. KRAUS — 2,674,983
INTERNAL-COMBUSTION ENGINE
Filed Sept. 1, 1949

INVENTOR.
Ludwig Kraus
ATTORNEYS.

UNITED STATES PATENT OFFICE 2,674,983

INTERNAL-COMBUSTION ENGINE

Ludwig Kraus, Stuttgart-Unterturkheim, Germany, assignor to Daimler-Benz Aktiengesellschaft, Stuttgart-Unterturkheim, Germany Application September 1, 1949, Serial No. 113,527

Claims priority, application Switzerland September 27, 1948

7 Claims. (Cl. 123—32)

The present invention relates to an internal combustion engine of any kind with one or more cylinders and more particularly to a diesel engine with prechamber (or another corresponding partial combustion chamber), and more particularly a prechamber which is arranged eccentrically with respect to the cylinder axis, for instance, adjacent to the valves provided in the cylinder head.

A feature of the present invention consists in that the passage connecting the prechamber with the main combustion chamber discharges and extends thereinto in a slightly slanting direction; the mentioned passage deviating only slightly from the vertical of the cylinder head or from a line parallel to the axis of the cylinder and as much as possible concentrically; viz., at least nearly concentrically or with only a slight eccentricity into the main combustion chamber, and that preferably furthermore in the upper dead center of the piston between the piston head and the discharge orifice of the connecting passage, a passage is formed having substantially the shape of an annular gap through which the contents of the prechamber are distributed in all directions over the main combustion chamber. The main combustion chamber is preferably formed for example, by a circular preferably shallow recess in the piston head and preferably with slight eccentricity with respect to the cylinder axis, the orifice of the connecting passage protruding advantageously into said recess near the head of the piston.

The invention is based on the following principle: In order to obtain a wanted or needed construction e. g. to obtain cooling passages of adequate dimensions insuring an efficient cooling of the prechamber and of the valve chambers and at the same time sufficiently large valves and thus a high output of the engine, the prechamber is arranged according to the present invention eccentrically with respect to the cylinder axis. This is important above all with small engines with two valves. On the other hand, the most favourable conditions for the mixing of fuel and air and thus for an even distribution and perfect combustion are present if the passage connecting the prechamber with the main combustion chamber discharges as much as possible centrally into the main combustion chamber. To obtain the first mentioned advantage and to keep the second one is the aim of the present invention which is obtained by the special arrangement of the prechamber according to the present invention in relation to the arrangement of the main combustion chamber and of the connecting passage. It should be mentioned that instead of valves also rotary valves may be provided and that the invention may also be applied to two cycle engines with slit scavenging, to engines with one valve only in the cylinder head and adjacent to the prechamber and to engines with valves placed elsewhere than in the cylinder head.

The form of an annular gap of the discharge orifice of the prechamber into the main combustion chamber is particularly suitable for an even distribution.

With the above in view, it is an object of the present invention to accomplish two requirements, namely, to provide a relatively great eccentricity of the prechamber on the one hand and simultaneously and as much as possible a central discharge of the connecting passage into the main combustion chamber on the other hand, which requirements are combined and balanced in such a way by a particular arrangement of prechamber, connecting passage and main combustion chamber that the most favourable results are obtained regarding output and fuel consumption.

It is a further object of the present invention to maintain the degree of inclination of the connecting passage from the perpendicular within such limits that in this way a steep impingement of the contents of the prechamber on the piston head is insured whereas the formation of zones with a considerable lack of fuel lateral or rearward of the main injection direction is prevented whereby the most favourable distributing effect of the annular gap is practically unimpaired.

Accordingly, as no eccentricity or only a slight eccentricity exists, the discharge orifice, which is in the form of an annular gap with respect to the main combustion chamber, prevents the accumulation of an excess of fuel in any part of the main combustion chamber. Furthermore, this arrangement also precludes insufficient feeding of any part of the main combustion chamber by reason of too great a distance from the annular gap. This is particularly the case within the limits taken here into consideration if inclination and eccentricity are in the most favourable ratio to each other in which with increasing inclination the eccentricity must also increase. With a steep inclination of the passage relative to the head of the piston the passage should discharge about concentrically.

For instance the eccentricity of the orifice is up to 15%, on an average 3–10% of the diameter of the main combustion chamber, e. g., with an inclination of 85 or 80° preferably not more than 5% and with an inclination of 70 or 60° not more than 10% of the diameter of the main combustion chamber, although the invention is not strictly limited to these dimensions. The inclination of the connecting passage may be 60–90°, preferably 75–85° this being the angle between the axis of the connecting passage and the cylinder head or the piston head.

In the event of the inclination of the connecting passage (or of the prechamber axis) and the eccentricity of its discharge orifice into the combustion chamber being insufficient to realize a sufficient eccentricity of the prechamber with respect to the cylinder axis (which again might be the case above all with small engines) the invention provides in addition, or instead of the eccentric arrangement of the discharge orifice of the connecting passage into the main combustion chamber, an eccentric arrangement of the main combustion chamber with respect to the cylinder axis, in which case the eccentricity is again preferably kept within restricted limits. It is clear that the total eccentricity of the center of the prechamber depends as well on the degree of inclination of the axis of the prechamber; viz., of the connecting passage, as on the height of the prechamber; i. e. the distance between the center of the prechamber and the top dead center of the piston, and on the eccentricity of the main combustion chamber and on the eccentricity of the orifice of the connecting passage. Preferably, the prechamber is eccentrically placed so that, on the one hand, sufficiently large valves and cooling spaces are secured, and that, on the other hand, the prechamber is placed substantially within the circumference of the cylinder, as viewed in the direction of the cylinder axis. This corresponds to an eccentricity of the prechamber (i. e. the distance of the center of the prechamber from the cylinder axis) of ¼–¾ of the cylinder radius, on an average therefore of about ½ of the cylinder radius. Furthermore, the diameter of the main combustion chamber is preferably so chosen that with small eccentricities of the main combustion chamber in relation to the cylinder space an annular rim of the cylinder head is obtained. The recess in the piston head or the main combustion chamber may have an eccentricity up to 20% of the diameter of the cylinder, preferably 5–10%. A diameter of the recess of ½–¾, on an average therefore of ⅔ of the cylinder diameter results in special advantageous conditions for this purpose.

If the main combustion chamber is not of circular shape, the magnitudes or values of other dimensions, which are based thereon; viz., on its diameter, naturally must be calculated on the basis of a corresponding circular-shaped main combustion chamber of about the same distributing action as the mentioned combustion chamber in question.

The shallow, approximately circular recess in the piston head is particularly adapted in this case as main combustion chamber and provides specially favourable thermal conditions. The rim surrounding such a recess prevents the prechamber contents, which are blown out from reaching the cylinder bore thereby forming residues thereon, and insures simultaneously at the moment of ignition a shape of the main combustion chamber favourable for the heat economy of the mixture. The fact that the contents of the prechamber are blown in all directions along to the shallow base of the recess and deflected upward at the piston rim causes eddy currents (as shown in the drawing) which also continue during the down stroke of the piston having as a consequence an advantageous eddying of the mixture. The additional eddies above the piston rim contribute likewise to an even mixture of fuel and air and consequently to a favourable result of the engine.

Although in this way in every case, only a proportionately slight eccentricity between cylinder, main combustion chamber and discharge orifice of the connecting passage and equally only a slight inclination of the connecting passage (corresponding to a further eccentricity) is provided, nevertheless an altogether considerable eccentricity of the prechamber with respect to the cylinder axis is made possible if the individual eccentricities are added up.

The cross section of the connecting passage and the cross section of the annular gap are preferably balanced particularly in such a way that throttling in the annular gap is at a maximum during the blasting or blowing out of the prechamber when the piston reaches the upper dead center. For this purpose it will do already, and it has proved to be particularly advantageous, to choose the arrangement and the dimensions such that the most restricted cross section of the annular gap existing at the end of the piston movement approximately corresponds to the cross section of the connecting passage, i. e. that the gap amounts to about one fourth of the passage diameter. Owing to the contraction occurring at the moment of the deflection of the blown out contents of the prechamber, an additional throttling takes place in the annular gap having a particularly favourable influence on the distribution in the main combustion chamber. A ball-shaped form of the prechamber is particularly advantageous both for thermal reasons and for the purpose of a thorough mixing of fuel and air. The prechamber is preferably enclosed by an insert simultaneously surrounding the nozzle like a sleeve, whereby the heat economy is further improved and the machining of the prechamber facilitated. The connecting passage is preferably formed by an insert protruding into the main combustion chamber and forming the annular gap together with the preferably plane base of the piston recess, the gap being confined preferably by substantially parallel surfaces and extending parallel with the piston head. Advantageously, the passage protrudes into the recess forming the main combustion chamber to a point near the head of the piston.

According to a special form of an embodiment of the present invention an exterior annular rim of the piston head is provided around the above mentioned recess and this rim is placed near the cylinder head, the bottom of said recess merging through rounded-off portions with the inner wall of said rim.

Engines according to the present invention distinguish themselves by a practically smokeless and perfect combustion with least possible excess of air and lowest possible fuel consumption yet relatively high output.

The invention simultaneously provides for the possibility of utilizing the space existing above the cylinder head without the need for disturbing lateral extensions proportional with the housing of the valves, of the prechamber, and of the injection nozzle. The prechamber (or the corresponding partial combustion chamber) may be ball-shaped and cast integral with the cylinder head.

Two forms of embodiment of the invention are illustrated in the accompanying drawing, in which.

Figures 1, 2, 3:
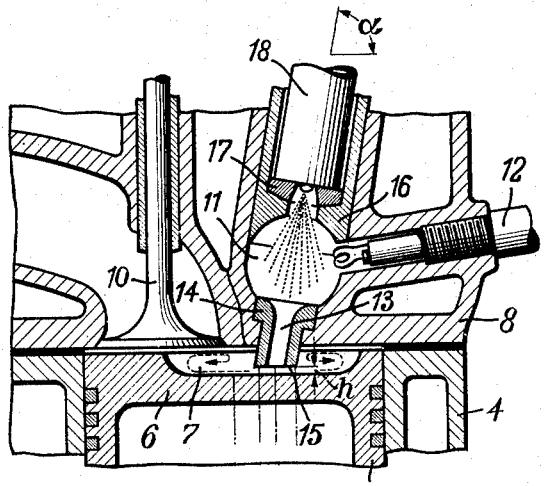
Fig. 1 is a section along the line 1—1 of Fig. 2.
Fig. 2 is a section through the cylinder (giving a plan view seen from below towards the cylinder head)
Fig. 3 is a somewhat modified form of embodiment of the prechamber giving an illustration corresponding to the section of Fig. 1.

With both forms of embodiment of the present invention, corresponding parts have the same reference numbers. The cylinder 4 of an internal combustion engine, otherwise not shown, houses the working piston 5. The piston head 6 is provided with a shallow recess 7 which has its center $M_2$ somewhat eccentrical with respect to the longitudinal axis $M_1$ of the cylinder. The cylinder head 8 includes a somewhat smaller exhaust valve 9 and a somewhat larger inlet valve 10 which are arranged laterally to the cylinder axis. The ball-shaped prechamber, which forms a partial combustion chamber with its center $M_4$ is surrounded on all sides by a cooling water current in the part of the cylinder head not occupied by the valves above the cylinder bore, with the exception at the location of a spark plug 12, which may be provided, and, as the case may be, at the location of the wall immediately adjacent to the valves. The prechamber is connected by a passage 13 with the main combustion chamber which is substantially formed by the recess 7 in the piston head. The passage 13 is formed by a liner 14 protruding into the recess 7 of the piston head. The longitudinal axis of the chamber 11 or of the liner is steeply inclined with respect to the piston head and forms with the piston head or with a plane perpendicular to the cylinder axis an angle $\alpha$ which is, e. g., between 70 and 85°. The end 15 of the liner 14 opposite the piston head is cut off parallel with the piston head and has in the upper dead center of the piston a distance $h$ from the piston head, e. g., such that the smallest cross section of the annular gap is equal to the cross section of the connecting passage in the liner. However, under special circumstances also a larger or smaller cross section of the annular gap may be chosen.

A sleeve 16 in the shape of a bowl closes with its concavity the chamber 11 at the side opposite the liner 13. The injection nozzle 18, which is screened against the chamber by an annular disc 17, is inserted in alignment with the connecting passage 13 into the sleeve 16.

As shown in Fig. 2, the total eccentricity E of the center of the prechamber 11 with respect to the cylinder axis, amounting, e. g., approximately to one half of the cylinder radius, is composed of the 3 eccentricities $e_1$, $e_2$ and $e_3$ which, each regarded by itself, is only slight. $M_1$ is in the case illustrated the center of the cylinder bore, $M_2$ that of the piston recess, $M_3$ that of the discharge orifice of the passage 13 into the main combustion chamber, and $M_4$ that of the chamber 11. As can be seen, these 4 centers are located approximately one behind the other so that the single eccentricities substantially are added; i. e. $E = e_1 + e_2 + e_3$. Only $M_2$ is slightly displaced with respect to the line $M_1$—$M_4$ with regard to the larger inlet valve 10. Preferably the eccentricity $e_2$ should be greater with an increasing obliquity of the connecting passage or reduced the steeper the latter is.

The form of embodiment according to Fig. 3 differs from that of Fig. 1 substantially in that the sleeve 16' is abutting against a collar 19 of the prechamber wall.

Instead of an uninterrupted annular passage of even height, an annular cross section passage of varying height may be utilized.

It will be noted by way of summary from the foregoing description, that the term "eccentricity" as used herein, is indicated as the distance between the axis of the cylinder and a line through the center of the prechamber, said line being parallel to the cylinder axis and from about ¼ to ¾ of the radius of the cylinder.

While a preferred embodiment of my invention has been described and shown herein, it is to be understood that various modifications as to form, arrangement of parts, and use of materials may be made without departing from the spirit and scope of the invention as claimed.

While I have herein shown and described a preferred embodiment of my invention, I wish to make it clear that my invention is not restricted to this embodiment, but what I claim is:

1. An internal combustion engine comprising a cylinder, a piston therein, said piston having a piston head formed with an offset, flat, shallow recess, the cylinder head above said piston having a flat, uninterrupted surface extending across the cylinder substantially perpendicular to the axis of said cylinder, said shallow recess in the piston forming the main combustion chamber, a precombustion chamber and a passage extending into the main combustion chamber and interconnecting the chamber and the precombustion chamber, said precombustion chamber being arranged eccentrically with respect to the cylinder axis, said passage interconnecting the precombustion chamber and the main combustion chamber discharging into the main combustion chamber at an inclination deviating slightly from the vertical in the piston head and having a slight eccentricity with respect to the cylinder axis, said passage forming with the piston a narrow annular gap having a lesser height than the height of the main combustion chamber, the eccentricity of the precombustion chamber with regard to the cylinder axis being between one-fourth to three-fourths of the cylinder radius.

2. An internal combustion engine according to claim 1, wherein the main combustion chamber has a relatively small eccentricity with respect to the cylinder axis, and the passage has an orifice of relatively small eccentricity with respect to the main combustion chamber, said two eccentricities and the eccentricity of the prechamber with regard to the orifice resulting from the inclination of the passage being positioned thus one behind the other so that the eccentricity of the prechamber is about equal to the sum of said three mentioned eccentricities.

3. An internal combustion engine comprising a cylinder head having a flat uninterrupted surface, a cylinder facing said uninterrupted surface and with a piston, said piston having a main combustion chamber in the head thereof surrounded by an annular rim of uneven width, a precombustion chamber arranged above and eccentrically to the axis of the cylinder, an injection nozzle opening eccentrically into the precombustion chamber, a connecting canal running obliquely but with relatively small inclination to the axis of this cylinder, said canal being directed towards the piston head, the outlet of the connecting canal and the piston being arranged with respect to each other so that at the piston top dead center there is formed a narrow annular gap with the wall of the outlet of the connecting canal and the piston head, said annular gap having a lesser height than that of the main combustion chamber connecting the connecting canal in an essentially radial direction with the main combustion chamber and the central point of the outlet of the connecting canal being eccentric to the center point of the main combustion chamber lying towards that side to which the precombustion chamber is eccentric to the axis of the cylinder.

4. The combination according to claim 3 in which said canal constitutes an insert extending into the piston recess in the upper dead center of the piston to near the bottom of the recess so that the main combustion chamber in the upper dead center of the piston forms an eccentric annular chamber around said annular throttle canal.

5. An internal combustion engine having a cylinder head with a flat bottom surface, at least one cylinder with a piston beneath said cylinder head, said flat bottom surface being substantially perpendicular to the axis of said cylinder, a flat shallow main combustion chamber in the piston, a prechamber and a passage connecting them, said prechamber being arranged eccentrically with respect to the cylinder axis, the passage connecting the prechamber with the main combustion chamber discharging at an inclination and substantially concentrically into the main combustion chamber, the inclination of the mentioned passage deviating slightly from the vertical to the piston head, said passage further discharging into the main combustion chamber and being arranged eccentrically, relatively thereto, said main combustion chamber being formed by a recess in the piston head, an insert enclosing the connecting passage and protruding into the main combustion chamber, the piston being thus dimensioned and controlled that a substantially annular gap between the orifice of the connecting passage and the piston head is formed in the upper dead center of the piston through which the contents escaping from the prechamber are distributed in all directions into the main combustion chamber.

6. In an internal combustion engine, a cylinder, a cylinder head having a flat bottom surface substantially perpendicular to the axis of said cylinder, a piston in said cylinder having a piston head with a relatively flat horizontal shallow recess therein whose center is disposed eccentrically of the longitudinal axis of the cylinder, which recess forms a main combustion chamber above the piston and with cylinder head, said cylinder head having a slightly inclined precombustion chamber therein disposed eccentrically of said axis of the cylinder and above the main chamber, an injection nozzle interconnecting the main and precombustion chambers and having a canal extending slightly at an incline toward the axis of the cylinder, the outlet of said canal forming a narrow annular gap having a lesser height than that of the main combustion chamber, said outlet being disposed to one side of the axis of the cylinder.

7. An internal combustion engine comprising a cylinder having a piston, a cylinder head having an uninterrupted surface substantially perpendicular to the axis of the cylinder and facing the piston, said piston having a piston head with a recess therein forming a main combustion chamber surrounded by an annular rim approaching the cylinder head in the upper dead center position of the piston, said recess being located eccentrically of the cylinder axis and forming an uneven annular rim relatively of the circumference of the piston head, a precombustion chamber in the cylinder head arranged eccentrically relatively of the cylinder axis to the same side as the recess and having a larger eccentricity than said recess, an injection nozzle extending through the uninterrupted surface of the head and opening into the precombustion chamber, an open connecting passage running obliquely to the cylinder axis and in the axis of the fuel injection spray so that the fuel can be injected immediately from the nozzle through the precombustion chamber and the passage into the main combustion space, said passage protruding into said main combustion chamber and being arranged with respect to the bottom of the piston head so that at the upper piston dead center there is formed a narrow annular gap with the wall of the outlet of the connecting passage and the piston head, said annular gap having an essentially lesser height than that of the main combustion chamber and connecting the connecting passage in essentially radial direction with the main combustion chamber, the inclination of said passage with respect to the bottom of the piston head in the axis of said passage in the upper dead center of the piston being at least 60 degrees and the central point of the outlet of the connecting passage being eccentric with respect to the center point of said recess and having an eccentricity with respect to the cylinder axis which is larger than the eccentricity of said recess, but smaller than that of the precombustion chamber with respect to the cylinder axis.

References Cited in the file of this patent

UNITED STATES PATENTS

| Number | Name | Date |
|---|---|---|
| 2,148,505 | Rosen | Feb. 28, 1939 |
| 2,316,269 | Maruhn | Apr. 13, 1943 |

FOREIGN PATENTS

| Number | Country | Date |
|---|---|---|
| 345,829 | Great Britain | Apr. 2, 1931 |
| 459,804 | Great Britain | Jan. 15, 1937 |
| 741,540 | France | Feb. 13, 1933 |
| 741,612 | France | Feb. 16, 1933 |
| 877,369 | France | Dec. 4, 1942 |
| 589,262 | Germany | Dec. 5, 1933 |
| 214,103 | Switzerland | July 1, 1941 |
| 103,183 | Sweden | Dec. 2, 1941 |

OTHER REFERENCES

Ser. No. 368,293, Mallinckrodt (A. P. C.), published May 11, 1943.